US012607522B2

(12) United States Patent
Geiger et al.

(10) Patent No.: US 12,607,522 B2
(45) Date of Patent: Apr. 21, 2026

(54) TEMPERATURE SENSOR ARRAY AND MICRO-HEATER THERMAL CALIBRATION

(71) Applicant: Iowa State University Research Foundation, Inc., Ames, IA (US)

(72) Inventors: Randall Geiger, Ames, IA (US); Degang James Chen, Ames, IA (US); Pallavi Sugantha Ebenezer, Ames, IA (US); Ruohan Yang, Ames, IA (US); Bryce Sena Gadogbe, Ames, IA (US); Kwabena Oppong Banahene, Ames, IA (US); Douglas Ambrose Zuercher, Morgan Hill, CA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 631 days.

(21) Appl. No.: 17/951,638

(22) Filed: Sep. 23, 2022

(65) Prior Publication Data

US 2023/0417607 A1 Dec. 28, 2023

Related U.S. Application Data

(60) Provisional application No. 63/356,213, filed on Jun. 28, 2022.

(51) Int. Cl.
*G01K 7/01* (2006.01)
*G01K 1/02* (2021.01)
*G01K 15/00* (2006.01)

(52) U.S. Cl.
CPC ........... *G01K 15/005* (2013.01); *G01K 1/026* (2013.01); *G01K 7/01* (2013.01); *G01K 15/002* (2013.01)

(58) Field of Classification Search
CPC ........ G01K 15/002; G01K 1/026; G01K 7/01; G01K 15/005
USPC .......................................................... 374/1
See application file for complete search history.

(56) References Cited

U.S. PATENT DOCUMENTS

| | | | |
|---|---|---|---|
| 11,105,757 B2 * | 8/2021 | Nakano ................... | G01F 1/692 |
| 11,181,426 B1 * | 11/2021 | Cullen ................. | G01K 15/005 |
| 2016/0252409 A1 * | 9/2016 | Lu ......................... | G01K 15/005 |
| | | | 702/99 |

FOREIGN PATENT DOCUMENTS

JP 2011185660 A * 9/2011

* cited by examiner

*Primary Examiner* — Peter J Macchiarolo
*Assistant Examiner* — Mireille S Sadate-Moualeu
(74) *Attorney, Agent, or Firm* — Withrow & Terranova, PLLC

(57) ABSTRACT

Various embodiments disclosed herein provide for an improved method for sensing the temperature at an individual sensor location that is both small in size, and the temperature can be determined independent of the temperature of the Temperature Management Controller (TMC). The method includes determining the temperature at the temperature sensing element or circuit based on a function of two voltages measured at the temperature sensing element. In a first embodiment, the two voltages are measured at two transistors that are each being supplied with the same current. In another embodiment, the temperature sensing element includes a single transistor that is supplied with two different currents at different times, and the voltages are measured at the same current, with each of the two voltages being measured based on the two currents being supplied to the transistor.

19 Claims, 13 Drawing Sheets

102

I_D6          306

Current MUX

V_DD

V_B          M_4          M_6

M_5

V_3          I_D2

I_D1          V_OUT2(T)          I_DS1          I_DSm

M_1          M_2

V_C          V_OUT1(T)          V_OUT4(T)          V_OUT4m(T)

M_3          M_81          V_OUT3(T)          M_8m          V_OUT3m(T)

M_71          M_7m

• • • •

TMC          502          604

Temp Sensor 1          Temp Sensor m

102

I_D3          306

V_DD

Current MUX

M_1          M_2          M_3          I_DS1          I_DSm

I_1          I_2

V_OUT4(T)          V_OUT4m(T)

V_D1          R_0          M_81          V_OUT3(T)          M_8m          V_OUT3m(T)

R_1          I_D1          I_D2          V_D2          R_2          M_71          M_7m

D_1          D_2          • • • •

TMC          502          604

Temp Sensor 1          Temp Sensor m

102

I_D3          306

V_DD

Current MUX

M_1          M_2          M_3          I_DS1          I_DSm

V_OUT4(T)          V_OUT4m(T)

R_2          M_81          V_OUT3(T)          M_8m          V_OUT3m(T)

D_1          D_2          M_71          M_7m

• • • •

TMC          502          604

Temp Sensor 1          Temp Sensor m

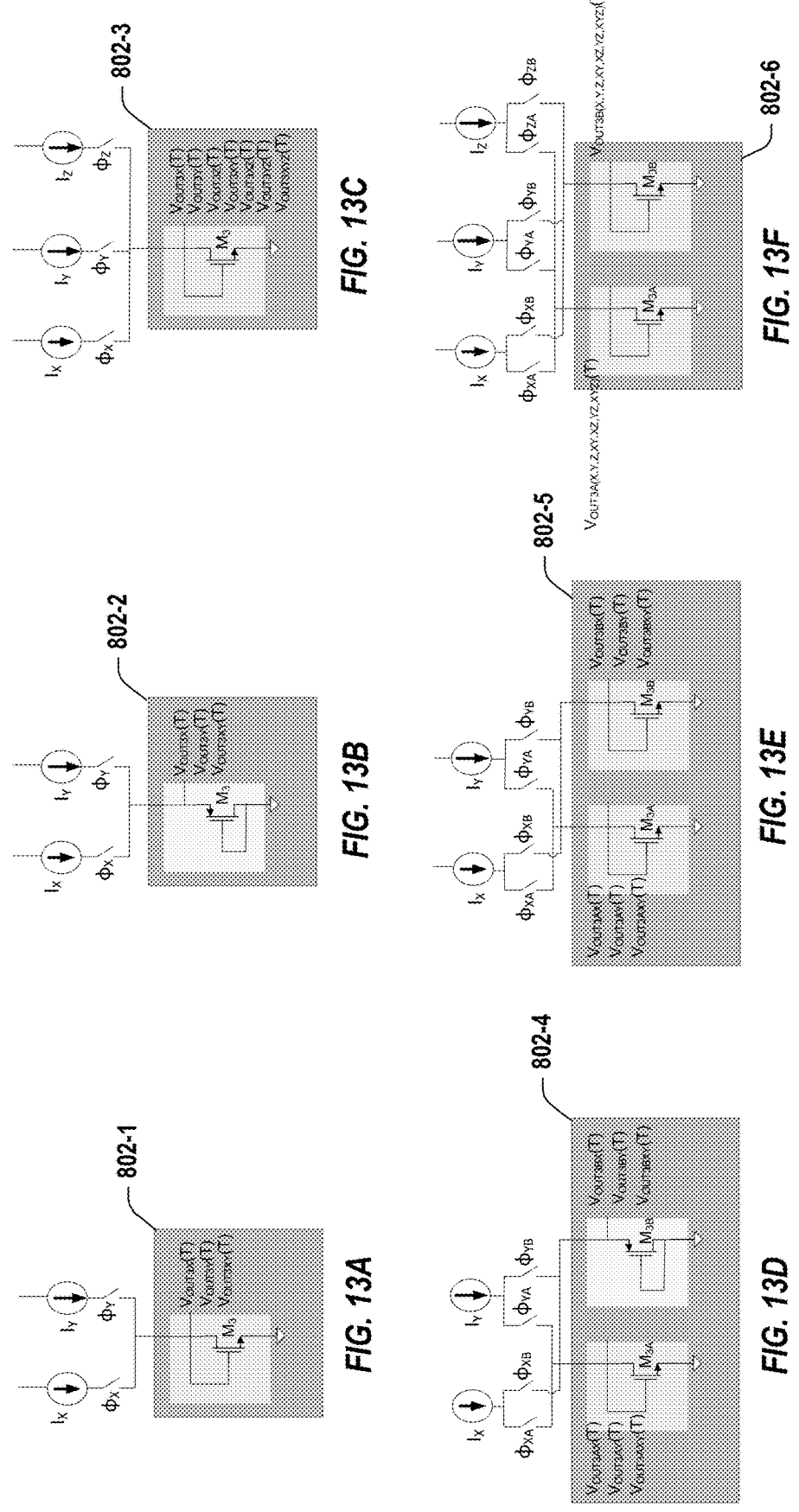

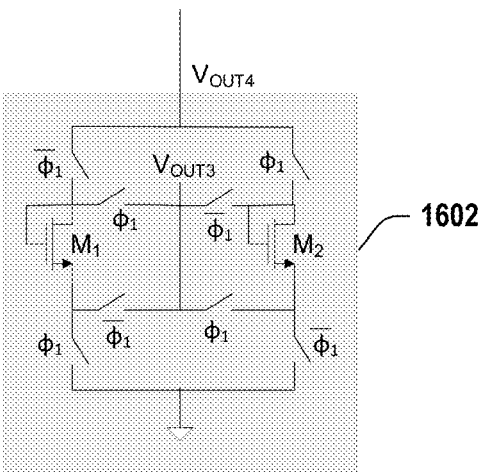
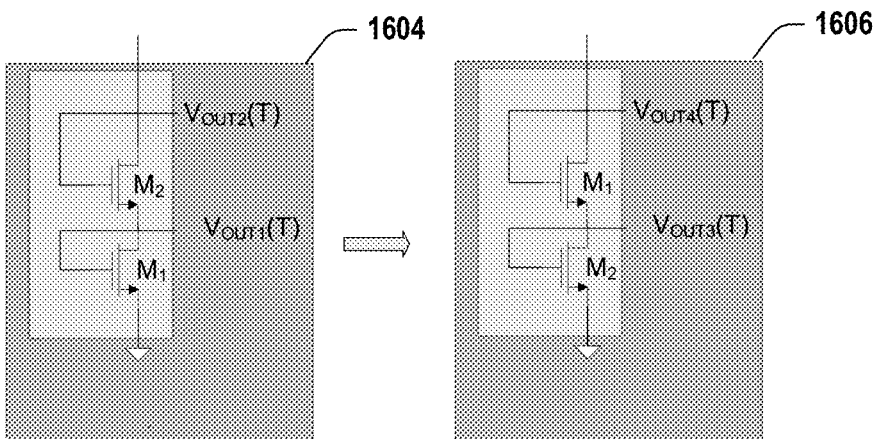
*FIG. 16*

TEMPERATURE SENSOR ARRAY AND MICRO-HEATER THERMAL CALIBRATION

RELATED APPLICATION

This application is a non-provisional conversion of and claims the benefit of priority to U.S. Provisional Application Ser. No. 63/356,213 that was filed on Jun. 28, 2022, entitled "COMPACT TEMPERATURE SENSORS FOR POWER/ THERMAL MANAGEMENT," the entirety of which is incorporated by reference herein.

FIELD OF THE DISCLOSURE

The present disclosure relates to temperature sensing circuits and a micro-heater thermal calibration system.

BACKGROUND

The performance, reliability, and lifetime of integrated circuits can be dependent on temperature. Temperature affects the electrical properties of devices such as resistors and transistors in a significant way which in-turn affects the performance of systems using these devices. Temperature also affects the lifetime and reliability of devices and inter-connects in integrated circuits. Invariably the lifetime of the devices is a highly nonlinear monotonic function of the operating temperature with higher temperatures decreasing the lifetime. To maintain an acceptable lifetime and corre-spondingly reliability, power/thermal management modules (PTMM) are included on many integrated circuits. The primary input to these PTMMs is the actual operating temperature at each critical location on a die. Typically, the control algorithm embedded in the PTMM will force the semiconductor device to reduce power dissipation when the temperature exceeds some critical value as measured by on-chip temperature sensors. Since the relationship between the mean time to failure (MTTF) and temperature is highly nonlinear, accurate measurement of the operating tempera-ture is important. To maintain reasonable control of the MTTF, absolute temperature sensor accuracy should be in the 1° C. range or tighter when operating near the critical temperature.

Since the temperature on an integrated circuit can vary considerably from one location to another, temperature sensors are typically placed at a large number of strategic positions on a die. The strategic positions are those that are likely to generate hot spots during normal operation. This is depicted in FIG. 1 where circles 104 denote the placement of the temperature sensors on the semiconductor die 100. The temperature sensors can be connected by a sensor bus 106 that electrically and or communicably couple the tem-perature sensors 104 with a Temperature Management Con-troller (TMC) 102. Invariably the strategic positions are locations where there is considerable activity in the circuit so there are usually tight spacing requirements at these critical locations. This necessitates extremely small tem-perature sensors so that the temperature sensor does not degrade the electrical performance of the circuits that it will help protect.

Temperature sensing elements can be one or more devices whose electrical characteristics are dependent upon tem-perature. The temperature sensor can be one or more tem-perature sensing elements. The temperature sensor exploits the temperature characteristics of these devices to sense temperature. Two of the most commonly used devices for sensing temperature on an integrated circuit are the pn junction and the MOS transistor. Two popular existing temperature sensors are shown in FIGS. 2A and 2B. In FIG. 2A, the temperature sensor 202 comprises a plurality of transistors, diodes, and resistors, where the characteristics of the diode are used to sense temperature. The voltage across the resistor R1 204, denoted as VOUT1(T), is nearly linearly dependent on temperature. In FIG. 2B, the temperature sensor 206 comprises three transistors M1, M2 and M3 are assumed to be operating at the same temperature and are used to sense temperature. The output voltage, denoted at VOUT2(T), is approximately proportional to the threshold voltages of these three devices.

Since the threshold voltage is nearly linearly dependent on temperature, the output voltage depends linearly with temperature.

However, neither of these circuits are particularly small and so are likely not suitable for building the compact temperature sensors depicted in FIG. 1. Using a single small device or a couple of small devices for the temperature sensors is one strategy that those skilled in the art would likely try to follow.

A temperature sensor array 100 using single MOS tran-sistors as temperature sensors is shown in FIG. 3. The TMC 102 provides bias current via circuit generator 304 and current multiplexer 306 to the individual temperature sen-sors 308-310. Temperature information of the kth tempera-ture sensor is carried in the voltage $V_{OUTSk}$ and a TMC controller 302 can determine the temperature based on the voltages. The TMC 102 can be located in an area that does not have the same compactness constraints as the tempera-ture sensors so area is less constrained. And, a single TMC 102 can support a large number of much smaller temperature sensors. Though the circuit depicted in FIG. 3 shows an output voltage that carries temperature information about each temperature sensor, this information will invariably be converted to a digital format for use in the Power/Thermal Management Module. The conversion to a digital format, not depicted in the figure, will also be part of the TMC.

One method for generating the current to bias the tem-perature sensors of FIG. 3 is shown in FIG. 4. In this circuit 402, the current in transistors $M_2$ and $M_3$ is mirrored to the individual temperature sensors 404 and 406. It can be shown that the current is quite nonlinear with temperature. If the temperatures of $M_1$, $M_2$, $M_3$ and $M_{Sk}$ are all the same, the output voltage will be approximately equal to the threshold voltage which is nearly linearly dependent upon T. But if the temperature of $M_{Sk}$ differs from that of the $T_{TMC}$, the nonlinear temperature dependence in the output current will introduce a rather significant nonlinear temperature depen-dence on the output voltage $V_{OUTSk}$.

Though this approach provides a compact solution, the individual output voltages, $V_{OUTk}$, $1 \leq k \leq m$, are dependent upon the threshold voltages of transistor $M_{Sk}$ as well as the threshold voltage of transistors $M_1$, $M_2$, and $M_3$. Hence the output voltage is dependent upon the temperature $T_k$ of the temperature sensor as well as the temperature of the TMC 102, denoted as $T_{TMC}$. Though this circuit can be used as a temperature sensor, it will be necessary to accurately know the temperature of the TMC to ultimately extract the tem-perature of the kth temperature sensor. A second limitation of this approach is the effects of the temperature dependence of the current, $I_{OUT}$, on the output voltage.

Calibration of temperature sensors is invariably required if accurate temperature measurements are to be obtained. There are often two or more model parameters that are temperature dependent and that often vary from one device to another. Calibration of the temperature sensors often requires making measurements of the sensor output at two or more temperatures. Unfortunately, the cost of testing at two or more temperatures is costly as well and calibrating a temperature sensor at a single temperature while obtaining calibration performance comparable to that achievable with a multi-temperature test is currently not possible.

SUMMARY

Various embodiments disclosed herein provide for an improved method for sensing the temperature at an individual sensor location that is both small in size, and the temperature can be determined independent of the temperature of the Temperature Management Controller (TMC). The method includes determining the temperature at the temperature sensing element or circuit based on a function of two voltages measured at the temperature sensing element. In a first embodiment, the two voltages are measured at two transistors that are each being supplied with the same current. In another embodiment, the temperature sensing element includes a single transistor that is supplied with two different currents at different times, and the voltages are measured at the same current, with each of the two voltages being measured based on the two currents being supplied to the transistor. A method of calibration of temperature sensors that gives a performance that is comparable to that achievable with multi-temperature measurements but where only a single test temperature is needed is also disclosed. It is based upon using on-chip calibration heaters where the heater power is accurately controlled to generate a precise local increase in temperature.

In an embodiment of the present disclosure, a temperature sensor circuit is provided that includes a current generator that generates a current, and a temperature sensing element that receives the current and generates at least two voltages based on the current. The temperature sensor circuit also includes a temperature controller that, based on a function of at least two voltages, determines a temperature at the temperature sensing element.

In another embodiment of the present disclosure, a temperature sensor circuit is provided that includes a current generator that generates two or more currents. The temperature sensor circuit also includes two or more temperature sensing elements that receive one current at a time and generate at least two voltages based on each of the currents. The temperature sensor circuit also includes a temperature controller that, based on a function of at least two voltages, determines a temperature at the temperature sensing elements In another embodiment of the present disclosure, a temperature sensor circuit is provided that includes a current generator that generates two or more currents. The temperature sensor circuit also includes a temperature sensing element that receives the two or more currents one at a time and generates two or more voltages based on the two or more currents and a temperature controller that, based on a function of the two or more voltages, determines a temperature at the temperature sensing element.

In another embodiment, a calibration system is provided that includes an on-chip heater and a temperature sensitive device, wherein in response to the on-chip heater being placed within a predefined distance to the temperature sensitive device, a temperature at the temperature sensitive device is modified by the heater that results in a device parameter associated with the temperature sensitive device changing. The calibration system also includes a controller that generates one or more constant power levels for the on-chip heater, and wherein based on the one or more constant power levels and an amount the device parameter changes, the controller calibrates a temperature sensitive parameter of the temperature sensitive device.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figures 7A, 7B, 7C:
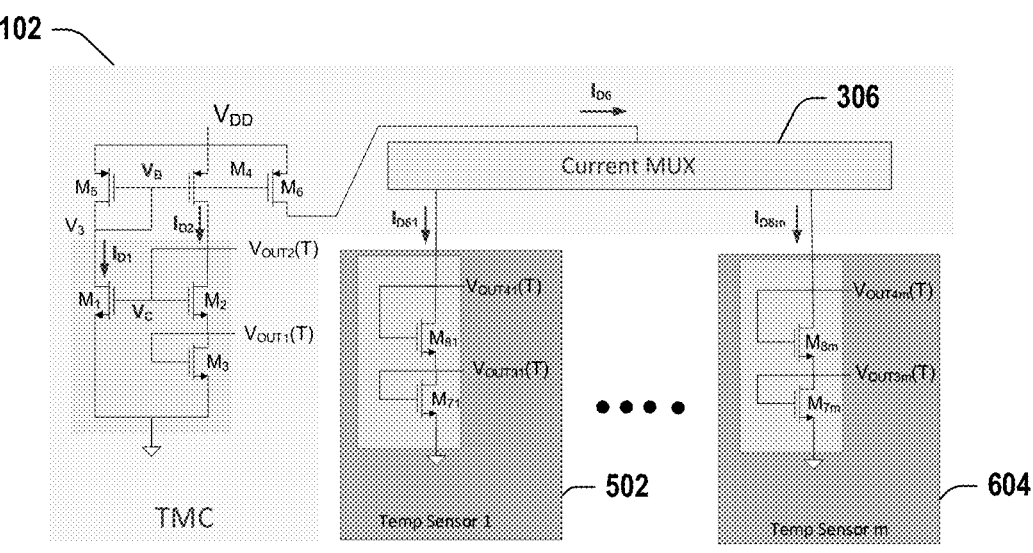

FIGS. 7A, 7B, and 7C are circuit diagrams of different embodiments of a temperature management controller according to one or more embodiments of the present disclosure.

Figure 8:
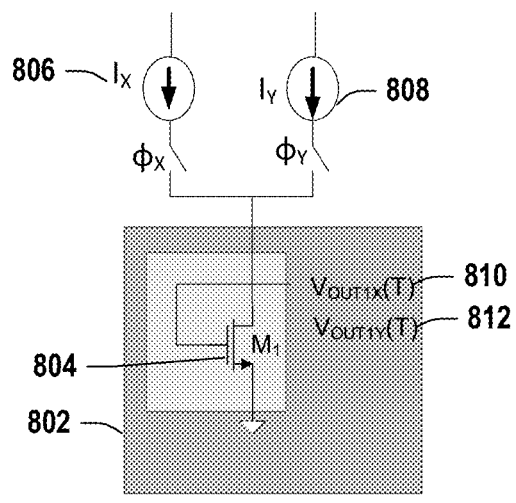

FIG. 8 is a circuit diagram of a temperature sensing element according to one or more embodiments of the present disclosure.

Figure 9:
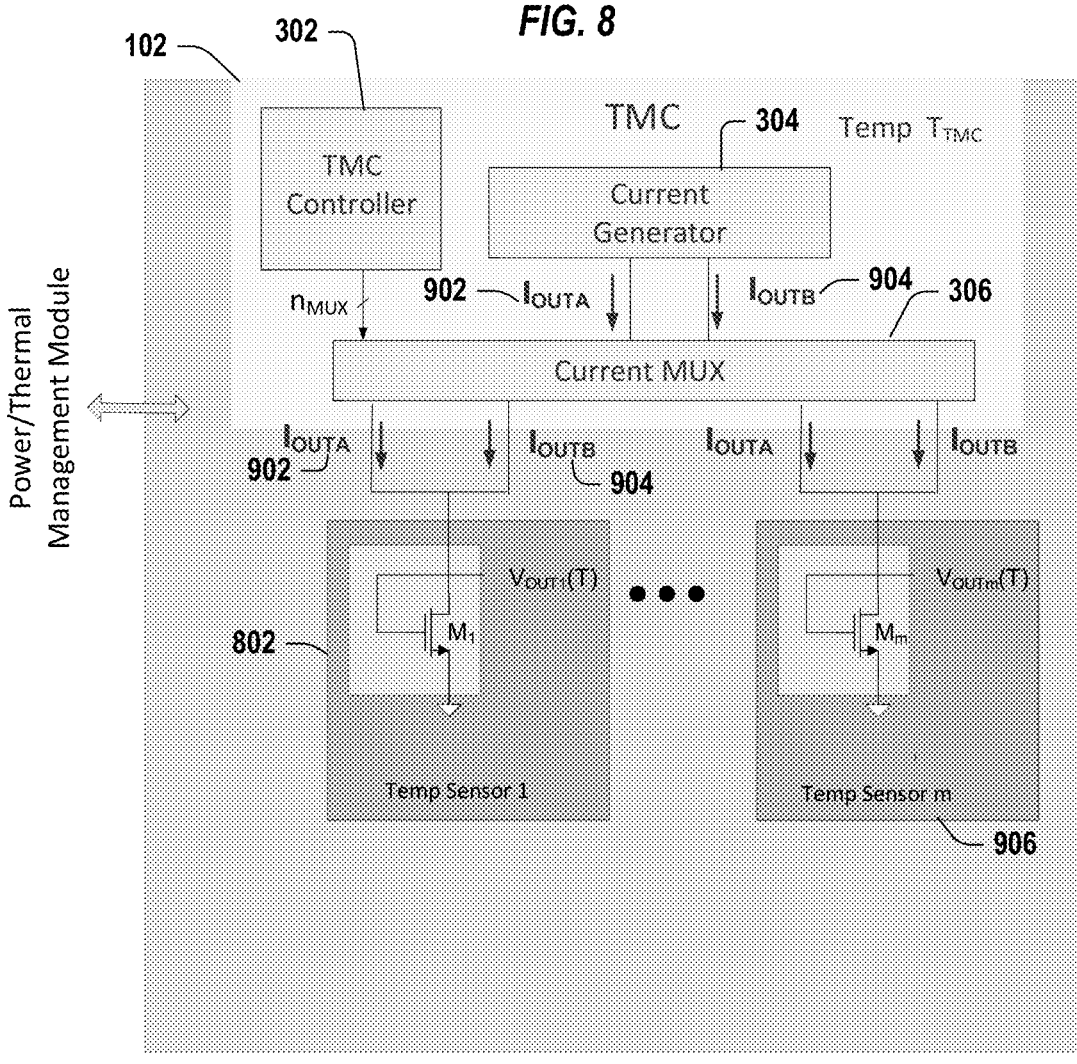
Figures 10A, 10B, 10C, 10D:
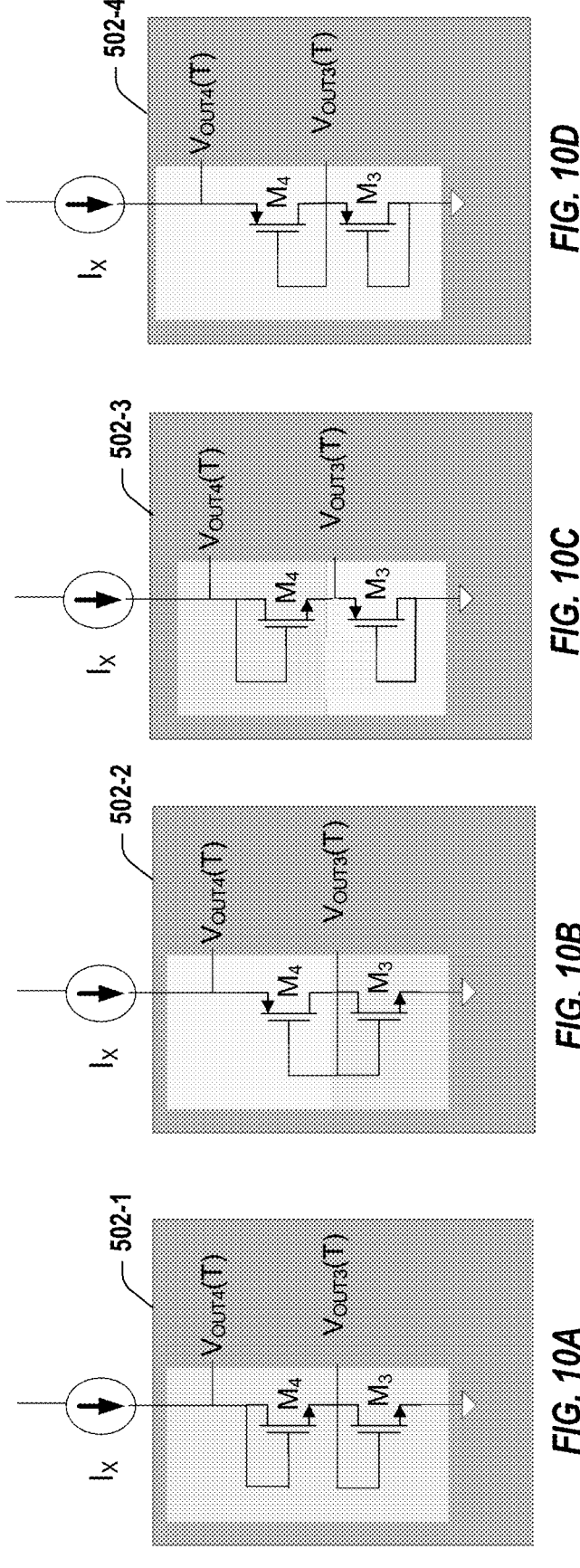

FIG. 9 is a block diagram of a temperature sensing array with the temperature sensing element of FIG. 8 according to one or more embodiments of the present disclosure.

Figure 5:
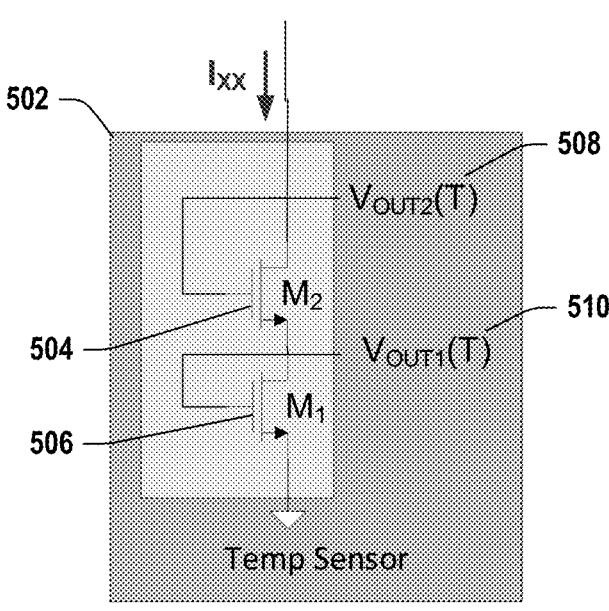
FIG. 5 is a circuit diagram of a temperature sensing element according to one or more embodiments of the present disclosure.

FIGS. 10A-D are circuit diagrams of different embodiments of the temperature sensing element of FIG. 5 according to one or more embodiments of the present disclosure.

Figure 11:
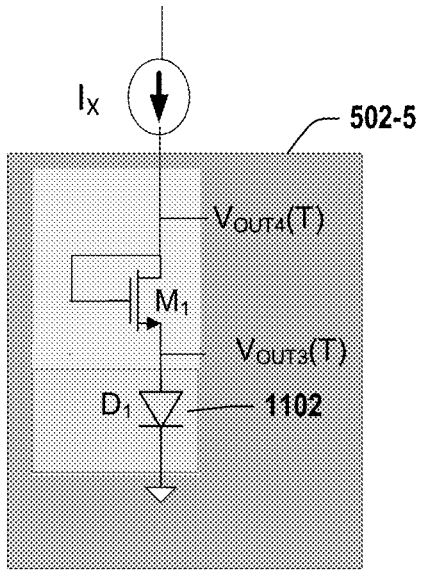

FIG. 11 is a circuit diagram of a different embodiment of the temperature sensing element of FIG. 5 according to one or more embodiments of the present disclosure.

Figure 12:
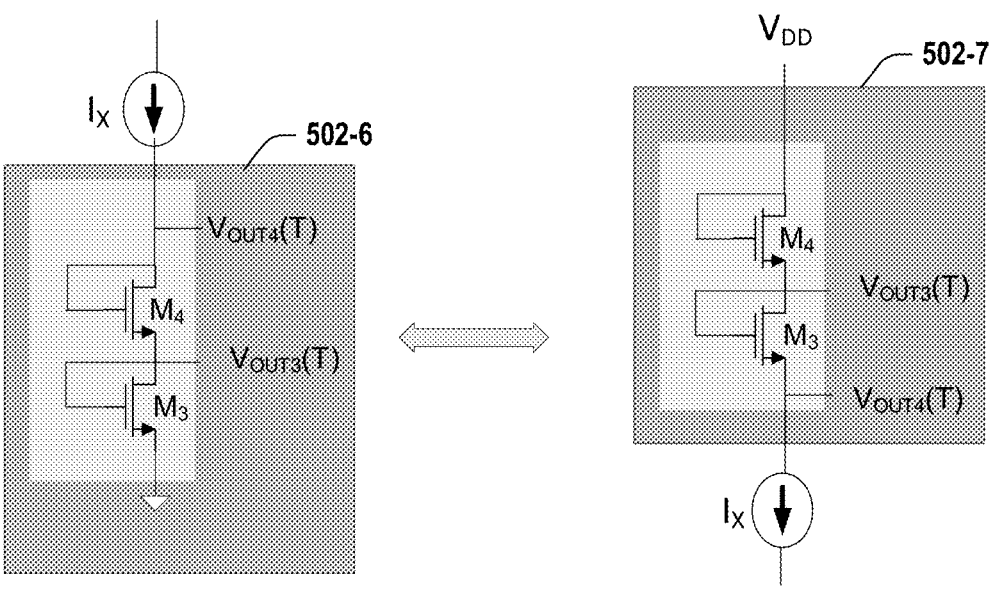

FIG. 12 is a circuit diagram of a different embodiment of the temperature sensing element of FIG. 5 according to one or more embodiments of the present disclosure.

FIGS. 13A-F are circuit diagrams of different embodiments of the temperature sensing element of FIG. 8 according to one or more embodiments of the present disclosure.

Figure 14B:
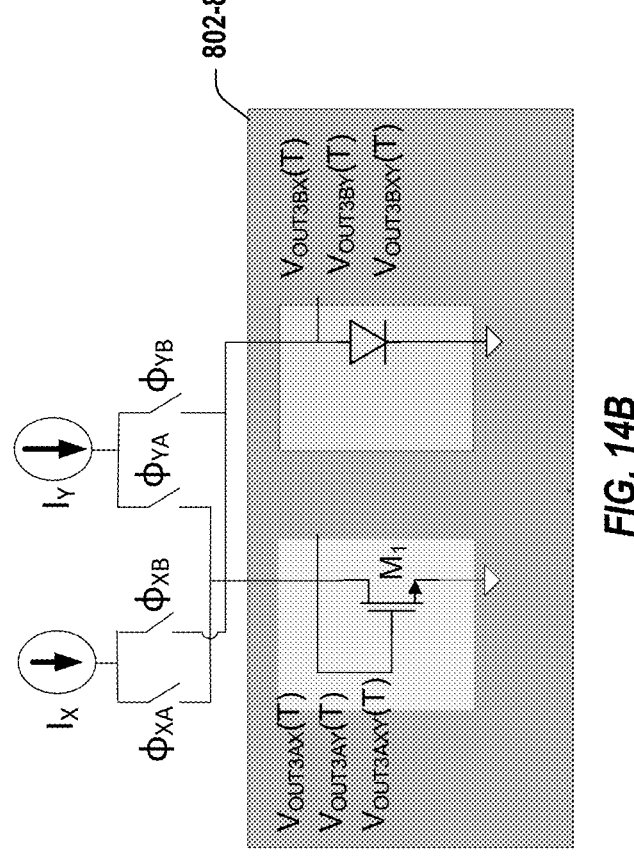
Figure 14A:
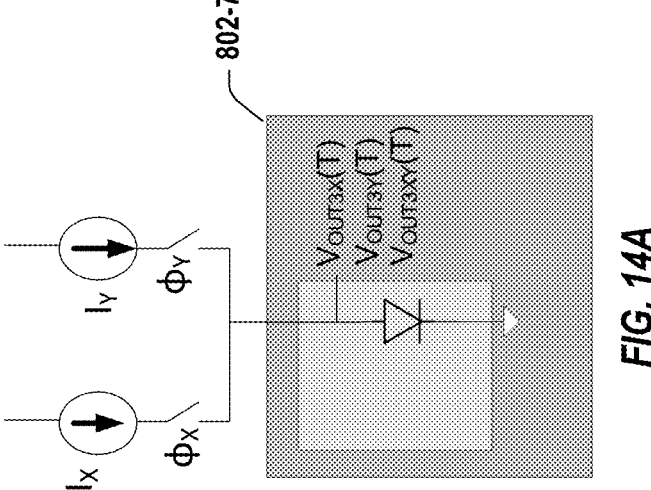
Figures 15A, 15B, 15C, 15D, 15E, 15F:
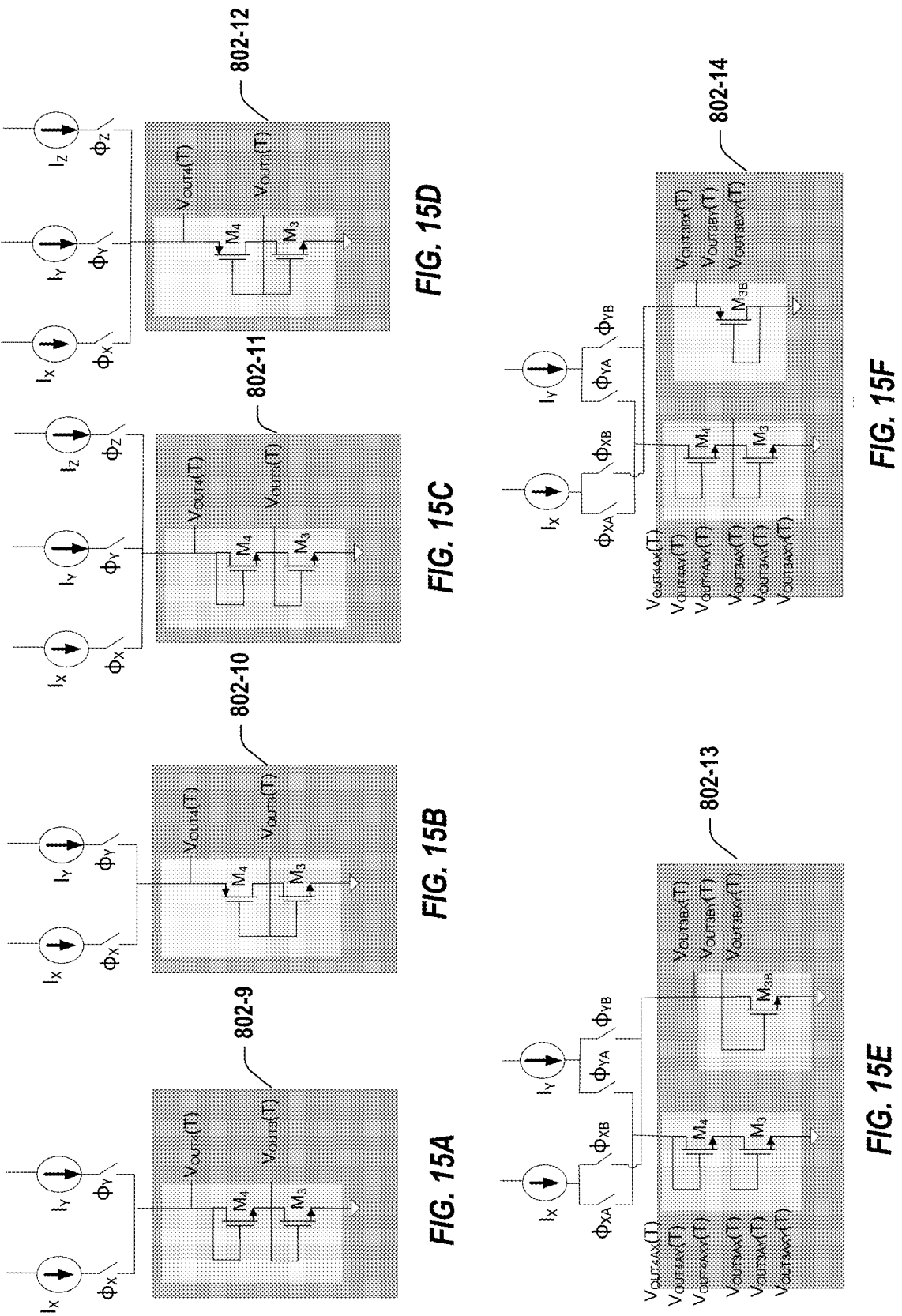

FIGS. 14A-B are circuit diagrams of different embodiments of the temperature sensing element of FIG. 8 according to one or more embodiments of the present disclosure.

FIGS. 15A-F are circuit diagrams of different embodiments of the temperature sensing elements combining the temperature sensing elements of FIGS. 5 and 8 according to one or more embodiments of the present disclosure.

FIG. 16 is a circuit diagram of switched temperature sensing elements according to one or more embodiments of the present disclosure.

Figure 17:
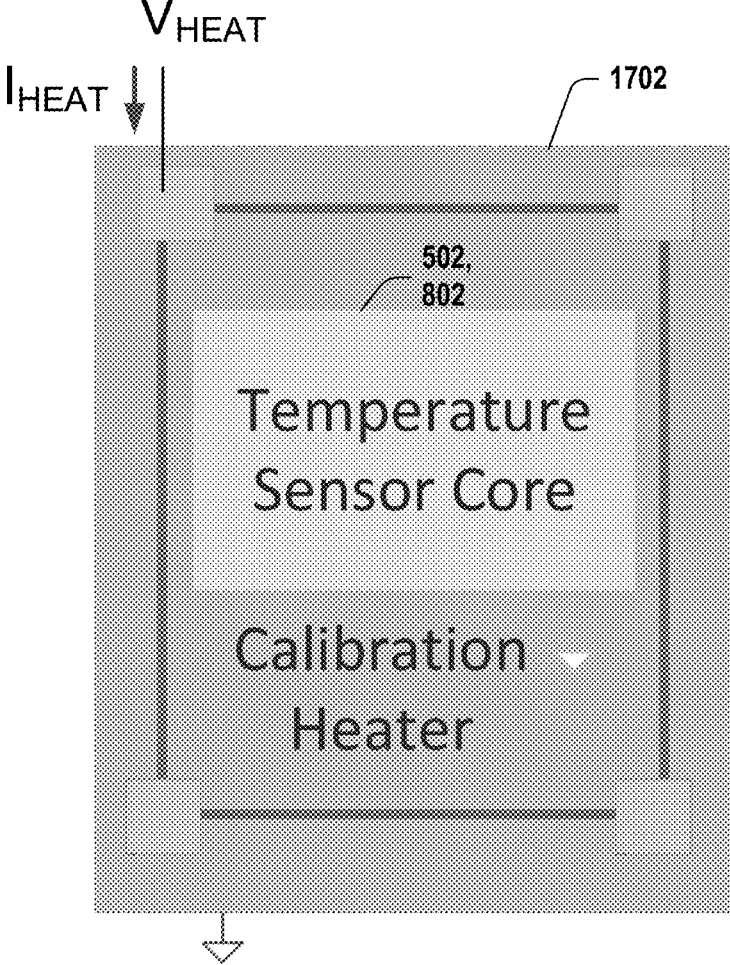

FIG. 17 is a block diagram of constant power micro-heater calibrator according to one or more embodiments of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims. It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
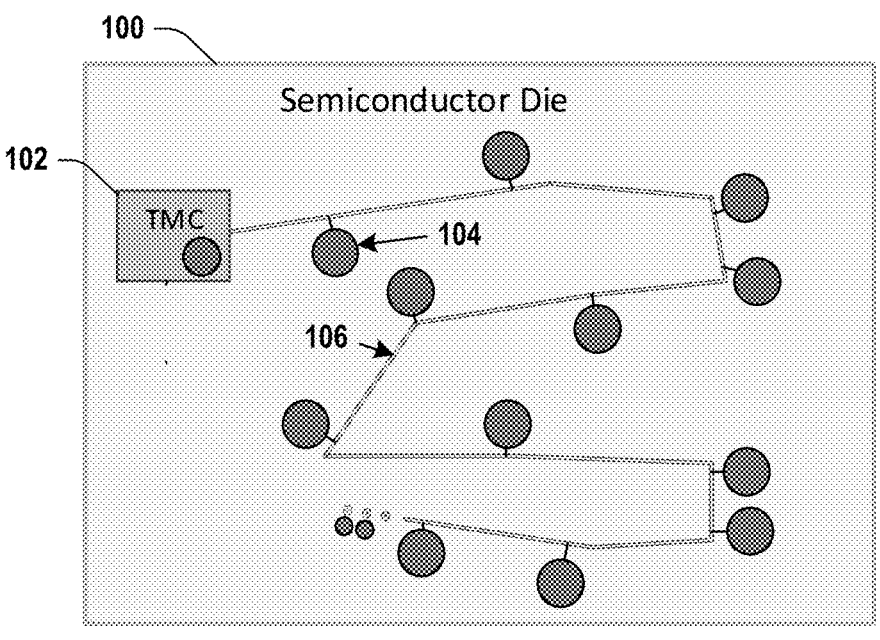
FIG. 1 is a block diagram of a temperature sensor array according to one or more embodiments of the present disclosure.
Figure 2A:
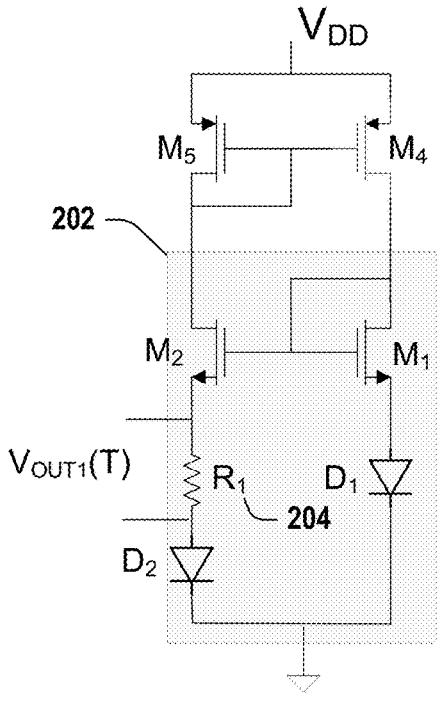
FIGS. 2A and 2B are previously known temperature sensor circuits.
Figure 2B:
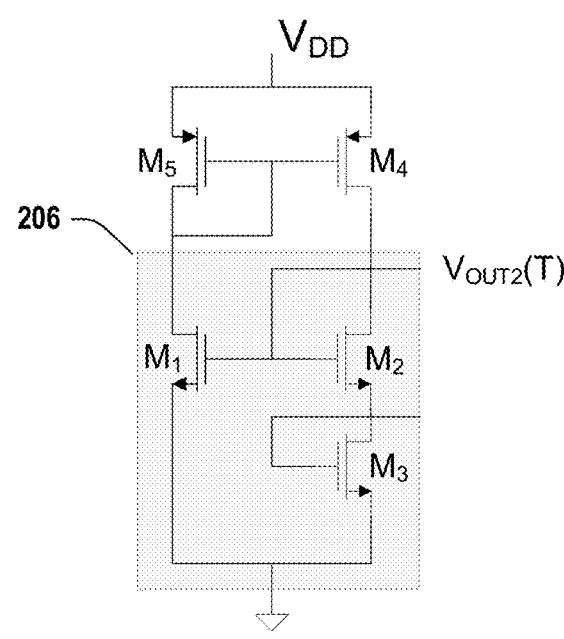
Figure 3:
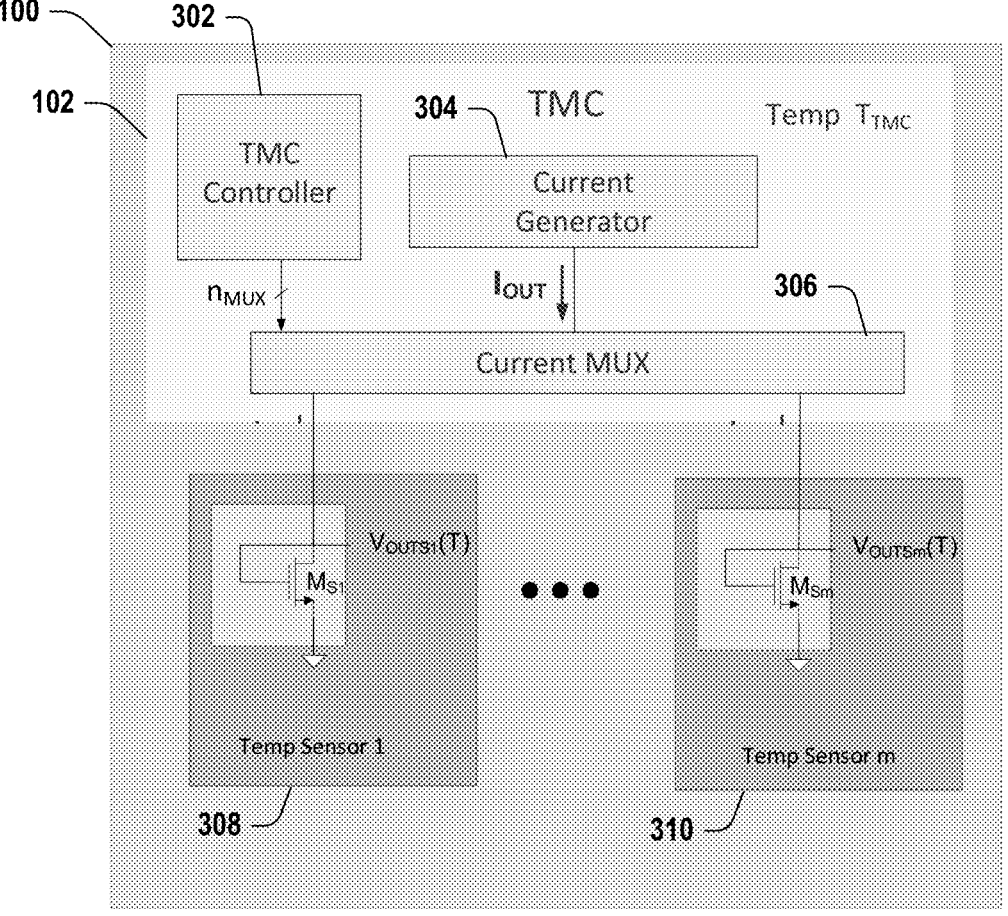
FIG. 3 is a previously known temperature sensor array using single transistor temperature sensors.
Figure 4:
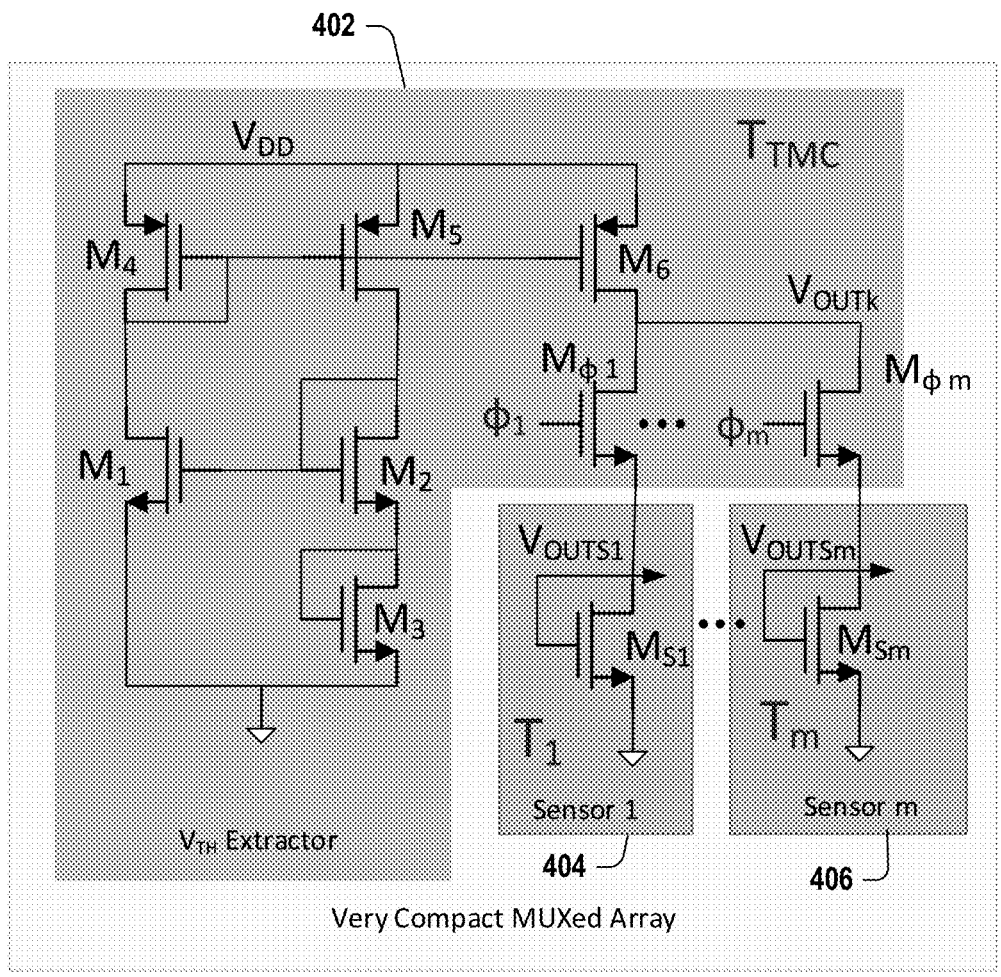
FIG. 4 is a temperature sensor array that generates bias currents for temperature sensing elements.

Two improved methods for sensing the temperature at the individual sensor location are presented that are independent of the temperature of the TMC 102, while also both providing a smaller footprint than the circuits in FIGS. 2A and 2B. These are denoted as Method 1 and Method 2 in this disclosure. A discussion of the two methods followed by natural extensions follows. A method of calibration of temperature sensors that gives performance that is comparable to that achievable with multi-temperature measurements but where only a single test temperature is needed is also disclosed. It is based upon using on-chip calibration heaters where the heater power is accurately controlled to generate a precise local increase in temperature. This disclosure will be concluded with some general comments about these structures and a very brief comparison of performance.

Both methods 1 and 2 are improved method for sensing the temperature at an individual sensor location that is both small in size, and the temperature can be determined independent of the temperature of the Temperature Management Controller (TMC). The methods include determining the temperature at the temperature sensing element or circuit based on a function of two voltages measured at the temperature sensing element. In a first embodiment, the two voltages are measured at two transistors that are each being supplied with the same current. In another embodiment, the temperature sensing element includes a single transistor that is supplied with two different currents at different times, and the voltages are measured at the same current, with each of the two voltages being measured based on the two currents being supplied to the transistor. A method of calibration of temperature sensors that gives performance that is comparable to that achievable with multi-temperature measurements but where only a single test temperature is needed is also disclosed. It is based upon using on-chip calibration heaters where the heater power is accurately controlled to generate a precise local increase in temperature.

Figure 6:
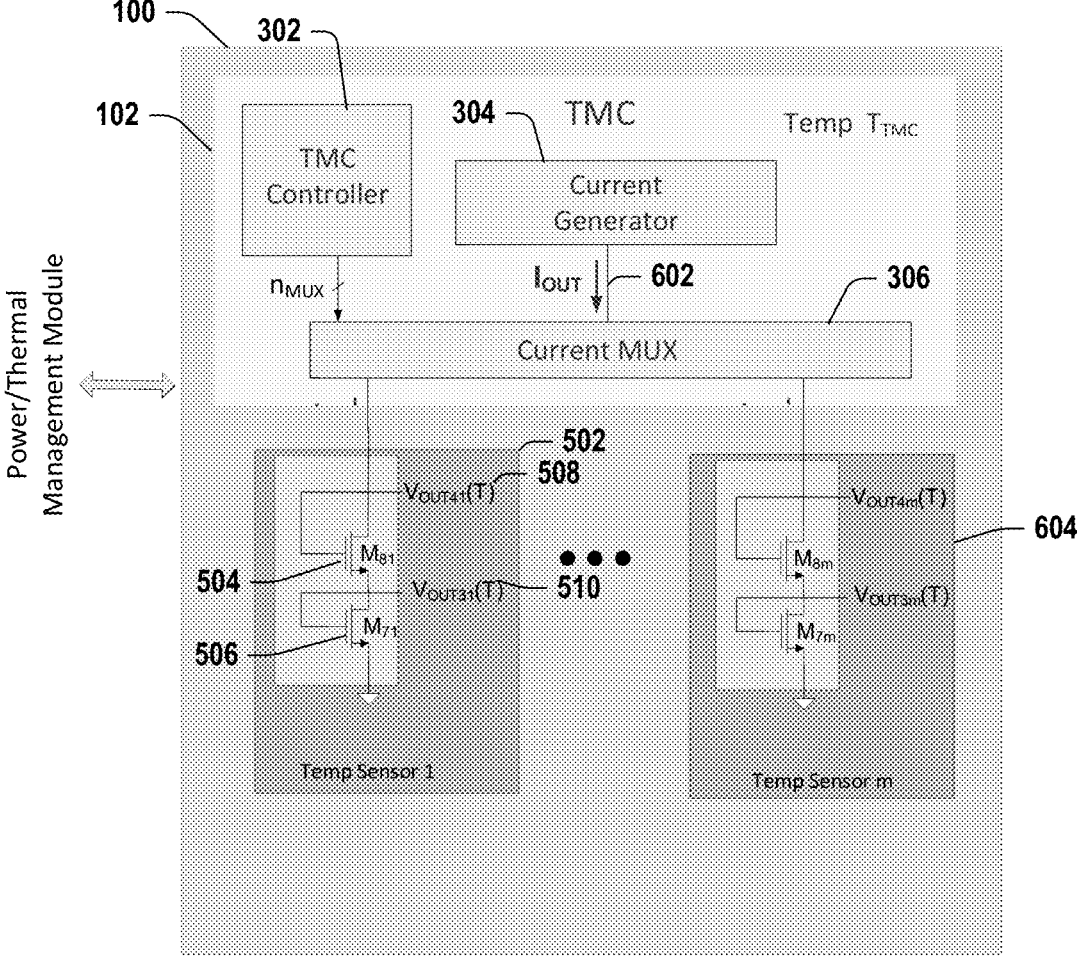
FIG. 6 is a block diagram of a temperature sensing array with the temperature sensing element of FIG. 5 according to one or more embodiments of the present disclosure.

A method of calibrating temperature sensors is disclosed that will allow for single-temperature calibration with performance comparable to that obtained with multi-temperature measurements. This approach uses an on-chip heater to rapidly generate one or more internal temperatures that are at an accurately determinable value above the test temperature thereby providing multi-temperature measurement data with a single test temperature. Though the concept of using on-chip heaters for thermal calibration is undoubtedly decades old, surprisingly there is little in the journal or patent literature on following this approach. But we believe the unique approach we are taking will make this approach practical. Though this calibration method is specifically focused for testing temperature sensors, it is applicable to calibration of other circuits where the standard for accurate performance requires measurements at more than one temperature The temperature-sensing element of Method 1 is shown in the most basic form in FIG. 5. The temperature sensor 502 can include two transistors 504 and 506 that can each generate a respective voltage 508 and 510 in response to a current being applied to the temperature sensor 502. A method of incorporating this temperature sensor 502 into a temperature sensor array 100 controlled by a temperature management controller (TMC) 102 is shown in FIG. 6. The key sensing element of FIG. 5 can be used independently of the TMC 102. In this implementation, a current $I_{OUT}$ 602 is generated by current generator 304 and multiplexed (muxed) by multiplexer 306 between a large number of temperature sensors 502-604 and at each temperature sensor location, two voltages (e.g., voltage 508 and 510) are generated designated as $V_{OUT3k}$ and $V_{OUT4k}$ in FIG. 6 or as $V_{OUT1}$ and $V_{OUT2}$ in FIG. 5. This circuit has the property that the temperature of the $k^{th}$ temperature sensor, $T_k$, can be accurately determined from the two voltages $V_{OUT3k}$ and $V_{OUT4k}$ independent of the excitation current, provided the excitation current is constant. This property is particularly useful since voltages can be practically measured during production test and since voltages can be practically and accurately measured during normal operation of a circuit throughout the useful life of the integrated circuit. Providing a temperature-independent current to excite the sensor does provide some challenges. Furthermore, the temperature $T_k$ can be accurately determined from the two voltages $V_{OUT3k}$ and $V_{OUT4k}$ even if the excitation current is modestly temperature dependent.

This relationship can be expressed mathematically as:

$$\hat{T}_k = f(V_{OUT3k}, V_{OUT4k}) \qquad \text{(Eqn 1)}$$

$$\frac{\partial \hat{T}_k}{\partial I_{out}} \text{ is small}$$

where $\hat{T}_k$ is an estimator of the temperature $T_k$.

Thus, if the current generator 304 is a part of the TMC 102, the temperature of the TMC 102, $T_{TMC}$, will not play a major role in determining the temperature of the sensor so that the relationship that follows is obtained:

$$\hat{T}_k = f(V_{OUT3k}, V_{OUT4k}) \qquad \text{(Eqn 2)}$$

$$\frac{\partial \hat{T}_k}{\partial T_{TMC}} \text{ is small}$$

The statement that temperature $T_k$ is a function of two voltages in Equation (1) may appear to be inconsistent because the two independent inputs to the circuit are actually the temperature, $T_k$, and the current, $I_{OUT}$. The function f as expressed in Equation (1) suggests that the independent parameters are the terminal voltages $V_{OUT3k}$ and $V_{OUT4k}$ and that the temperature $T_k$ is a dependent parameter. This equation should be interpreted as the mathematical relationship between the independent and dependent parameters that can be expressed in terms of the function f.

Modeling of Temperature Sensor

The basic properties of the temperature sensor can be derived using an analytical square-law model of the transistor. Computer simulations show that if more accurate device models are used, the temperature sensor circuit can still provide a good estimate of temperature even if the excitation current is not constant.

If the temperature-dependent threshold voltage of a transistor is denoted as $V_{TH}(T_k)$, it will be shown using the square-law device model that the threshold voltage can be expressed as $V_{THk}(T_k) = g(V_{OUT3k}, V_{OUT4k})$, $k \in \{=1 \ldots m\}$. The threshold voltage of a device is inherently independent of the current in a device, in this case $I_{OUT}$ ($I_{OUT}$ is muxed to generate the bias currents for the temperature sensors). After $V_{THk}(T_k)$ is obtained, the temperature-dependent expression for $V_{THk}$ can be solved to obtain $T_k$. As before, it should be emphasized that $V_{THk}$ is not a dependent variable dependent upon independent variables $V_{OUT3k}$ and $V_{OUT4k}$ but rather the function g characterizes the mathematical relationship between $V_{THk}$, $V_{OUT3k}$, and $V_{OUT4k}$.

In this analysis, it will be assumed that the device model parameters for $M_{8k}$ and $M_{7k}$ are matched. It follows that the two diode-connected transistors are operating in the saturation region and from the square-law model, since the two transistors are connected in series, the current for each temperature sensor for $k \in \{=1 \ldots m\}$ can be expressed as:

$$I_{OUT} = \frac{\mu_k C_{OXk} W_{7k}}{2 L_{7k}} (V_{OUT3k} - V_{THk})^2$$

$$I_{OUT} = \frac{\mu_k C_{OXk} W_{8k}}{2 L_{8k}} (V_{OUT4k} - V_{OUT3k} - V_{THk})^2$$

Eliminating $I_{OUT}$ between these two equations and assuming model parameters are matched, one obtains:

$$V_{THk} = \frac{V_{OUT4k} - V_{OUT3k}\left(1 + \sqrt{\dfrac{W_{7k} L_{8k}}{W_{8k} L_{7k}}}\right)}{1 - \sqrt{\dfrac{W_{7k} L_{8k}}{W_{8k} L_{7k}}}} \qquad \text{(Eqn 3)}$$

This can be expressed as:

$$V_{THk} = g(V_{OUT3k}, V_{OUT4k}) = \qquad \text{(Eqn 4)}$$

$$V_{OUT3k}\left(\frac{1 + \sqrt{\dfrac{W_{7k} L_{8k}}{W_{8k} L_{7k}}}}{1 - \sqrt{\dfrac{W_{7k} L_{8k}}{W_{8k} L_{7k}}}}\right) - V_{OUT4k}\left(\frac{1}{1 - \sqrt{\dfrac{W_{7k} L_{8k}}{W_{8k} L_{7k}}}}\right)$$

Thus if the voltages $V_{OUT3k}$ and $V_{OUT4k}$ are measured, the function $g(V_{OUT3k}, V_{OUT4k})$ is independent of the current $I_{OUT}$ and is actually linear in the quantities $V_{OUT3k}$ and $V_{OUT4k}$. Though the voltages $V_{OUT3k}$ and $V_{OUT4k}$ are highly dependent upon current, the function $g(V_{OUT3k}, V_{OUT4k})$ is current independent. This linear dependence is important because even if more complicated device models are used, the dependence of the threshold voltage on these two voltages is nearly linear.

Now assume that the threshold voltage is linear in T as well and can be expressed as:

$$V_{THk}(T_k) = V_{TH0} + \gamma T_k \qquad \text{(Eqn 5)}$$

where $V_{TH0}$ and $\gamma$ are model parameters that are independent of temperature. Substituting into Equation (3) and solving for $T_k$, one obtains:

$$T_k = \frac{\dfrac{V_{OUT4k} - V_{OUT3k}\left(1 + \sqrt{\dfrac{W_{7k} L_{8k}}{W_{8k} L_{7k}}}\right)}{1 - \sqrt{\dfrac{W_{7k} L_{8k}}{W_{8k} L_{7k}}}} - V_{TH0}}{\gamma} \qquad \text{(Eqn 6)}$$

This is the function $f(V_{OUT3k}, V_{OUT4k})$ described above. Note that f is linear in $V_{OUT3k}$, $V_{OUT4k}$, and $V_{TH0}$.

If a higher-order model for the temperature dependence of the threshold voltage in Equation (4) is used, the expression for $T_k$ is somewhat more complicated but the threshold voltage is still of the form $V_{THk}=g(V_{OUT3k}, V_{OUT4k})$ and $T_k$ can still be readily obtained by solving this expression for $T_k$.

If a more complicated model is used for the MOS transistors, the concept of a single model parameter termed the "threshold voltage" playing a key role in the operation of the transistor becomes blurred, and extraction of this blurred parameter from the voltages $V_{OUT3k}$ and $V_{OUT4k}$ with the circuit of FIG. 6. becomes only approximate. But it can be shown that there is sufficient information in the two voltages $V_{OUT3k}$ and $V_{OUT4k}$ to extract temperature, and even if not precisely extracted, very close approximations to the temperature $T_k$ can still be obtained from relatively simple functions of these two voltages. The relatively simple functions that naturally evolve likely will be only weakly dependent upon the functional form of the temperature dependence of the current $I_{OUT}$ and hence only weakly dependent upon the temperature of the TMC 102.

In many temperature-sensing applications, sufficient accuracy can be obtained from simple expressions involving $V_{OUT3k}$ and $V_{OUT4k}$ by neglecting the weak dependence of the temperature of the TMC. Though the dependence on temperature of the TMC is weak, a better approximation of the temperature $T_k$ can be obtained if the temperature dependence of the TMC 102 is included. This can be stated mathematically as follows:

There exists a reasonably simple function $g_1$ such that the threshold voltage $V_{THk}$ can be expressed as $V_{THk}=g_1$ ($V_{OUT3k}, V_{OUT4k}, T_{TMC}$) where the sensitivity of $g_1$ to $T_{TMC}$ is small.

The functional form of $g_1$ will be dependent upon how the current $I_{OUT}$ is generated in the TMC 102. Since the sensitivity of $g_1$ to $T_{TMC}$ is presumably small, if an approximate measurement of $T_{TMC}$ is also obtained, the temperature of the temperature sensor, $T_k$, can be obtained by solving the temperature dependent threshold voltage equation for $T_k$.

TMC Implementations

Many different circuits can be used to generate the current needed to bias the temperature sensors. In the three different embodiments shown in FIGS. 7A, 7B, and 7C, there are different circuits that can supply current from the TMC 102 to the current multiplexer 306 for delivery to temperature sensors 502-604. Three methods are shown in FIG. 7. In FIG. 7A, the current $I_{D6}$ has a somewhat nonlinear temperature dependence. In FIG. 7B, the current $I_{D3}$ is nearly constant. And in FIG. 7C, the current $I_{D3}$ will be nearly proportional to absolute temperature (PTAT). The temperature dependence of the current will affect higher-order nonlinearities in the temperature sensor.

Method 2

The key temperature-sensing element for Method 2 is shown in its most basic form in FIG. 8. In this, a temperature sensor 802 can comprise a single transistor 804 that is provided with both currents 806 and 808 that result in voltages measured at the transistor 804 of voltage 810 and voltage 812. The currents 806 and 808 can be applied alternately or alternated at a predefined rate or frequency. A method of incorporating this into a temperature sensor array controlled by a TMC 102 is shown in FIG. 9. In this implementation, two currents $I_{OUTA}$ 902 and $I_{OUTB}$ 904, are muxed by current multiplexer 306 between a large number of temperature sensors (e.g., 802 and 906). It is to be appreciated that while two temperature sensors are depicted here, in other embodiments, any number of temperature sensors are possible. Two scenarios will be considered for describing the operation of the Method 2 temperature sensor. In the first scenario, it will be assumed that the ratio between the two currents $I_{OUTA}$ 902 and $I_{OUTB}$ 904 is known. This ratio can be easily measured in the TMC at production test. In the second scenario, it will be assumed that the relationship between $I_{OUTA}$ 902 and $I_{OUTB}$ 904 is unknown.

Scenario 1

In the first scenario, assume the known ratio $I_{OUTB}/I_{OUTA}$ is designated as $M_{AB}$ and that this ratio is independent of temperature. Likely these currents will be generated with current mirrors in the TMC, though not necessarily. For each of the currents at each temperature sensor location, two voltages are generated. These voltages are designated as $V_{OUTkA}$ and $V_{OUTkB}$ in FIG. 9 or as $V_{OUT1X}$ 810 and $V_{OUT1Y}$ 812 in FIG. 8. Much like the Method 1 approach, this circuit has the property that the temperature of the $k^t$h temperature sensor can be accurately determined from the two voltages $V_{OUTkA}$ and $V_{OUTkB}$ independent of the currents, even if the currents are highly temperature dependent. This property is particularly useful since voltages can be practically measured during production test and since voltages can be practically and accurately measured during normal operation of a circuit throughout the useful life of the integrated circuit. Providing a temperature-independent current ratio to excite the sensor does provide some challenges. Furthermore, the temperature $T_k$ can be accurately determined from the two voltages $V_{OUTkA}$ and $V_{OUTkB}$ even if the excitation current ratio is modestly temperature dependent.

This relationship can be expressed mathematically as:

$$\hat{T}_k = f(V_{OUTkA}, V_{OUTkB}) \qquad \text{(Eqn 7)}$$

$$\frac{\partial \hat{T}_k}{\partial I_{OUTA}} \text{ and } \frac{\partial \hat{T}_k}{\partial I_{OUTB}} \text{ are small}$$

where $\hat{T}_k$ is an estimator of the temperature $T_k$. The function f is dependent upon the circuit structure of the temperature sensor. Thus if the current generator is a part of the TMC 102, the temperature of the TMC 102, $T_{TMC}$, will not play a major role in determining the temperature of the sensor so as to obtain the relationship:

$$\hat{T}_k = f(V_{OUT4k}, V_{OUTBk}, V_{OUTABk}) \qquad \text{(Eqn 8)}$$

$$\frac{\partial \hat{T}_k}{\partial T_{TMC}} \text{ is small}$$

As for the first temperature sensor, the statement that temperature $T_k$ is a function of two voltages in Equation (7) may appear to be inconsistent because the independent inputs to the circuit are actually the temperature, $T_k$, and the two currents, $I_{OUTA}$ and $I_{OUTB}$. The function f as expressed in Equation (7) suggests that the independent parameters are the terminal voltages $V_{OUTk}$ and $V_{OUT4k}$ and that the temperature $T_k$ is a dependent parameter. This equation should be interpreted as the mathematical relationship between the independent and dependent parameters that can be expressed in terms of the function f.

Modeling of Temperature Sensor

The square-law model will be used to show that ideally if the current ratio $M_{AB}$ is known, a function $V_{THk}=g(V_{OUTAk}, V_{OUTBk})$ can be obtained that is independent of the individual values of $I_{OUTA}$ and $I_{OUTB}$. After the expression for $V_{THk}$ is obtained, it can be solved to obtain $T_k$. If follows from the square-law model that $I_{OUTA}$ and $I_{OUTB}=M_{AB}I_{OUTA}$ can be expressed as:

$$I_{OUTA} = \frac{\mu_k C_{OXk} W_k}{2L_k}(V_{OUTAk} - V_{THk})^2$$

$$M_{AB}I_{OUTA} = \frac{\mu_k C_{OXk} W_k}{2L_k}(V_{OUTBk} - V_{THk})^2$$

then eliminating $I_{OUTA}$ between these two equations, one obtains:

$$V_{THk} = \frac{\sqrt{M_{AB}}\, V_{OUTAk} - V_{OUTBk}}{\sqrt{M_{AB}} - 1}$$

This can be expressed as:

$$V_{THk} = g(V_{OUTAk}, V_{OUTBk}) = \qquad\qquad \text{(Eqn 9)}$$

$$V_{OUTAk}\left(\frac{\sqrt{M_{AB}}}{\sqrt{M_{AB}} - 1}\right) - V_{OUTBk}\left(\frac{1}{\sqrt{M_{AB}} - 1}\right)$$

Thus if the voltages $V_{OUTAk}$ and $V_{OUTBk}$ are measured and $M_{AB}$ is known, the function $g(V_{OUTAk}, V_{OUTBk})$ is independent of the currents $I_{OUTA}$ and $I_{OUTB}$ and is actually linear in the variables $V_{OUTAk}$ and $V_{OUTBk}$.

Now assume that the threshold voltage is linear in T and can be expressed as:

$$V_{THk}(T_k) = V_{THk0} + \gamma T_k \qquad\qquad \text{(Eqn 10)}$$

where $V_{THk0}$ and $\gamma$ are model parameters that are independent of temperature. Substituting into Equation (9) and solving for $T_k$, one obtains:

$$T_k = \frac{\dfrac{\sqrt{M_{AB}}\, V_{OUTAk} - V_{OUTBk}}{\sqrt{M_{AB}} - 1} - V_{THk0}}{Y} \qquad\qquad \text{(Eqn 11)}$$

This is the function $f(V_{OUTAk}, V_{OUTBk})$ described above. Note that f is linear in $V_{OUTAk}$, $V_{OUTBk}$ and $V_{THk0}$.

If a higher-order model for the temperature dependence of the threshold voltage in Equation (10) is used, the expression for $T_k$ is somewhat more complicated, but the threshold voltage is still of the form $V_{THk} = g(V_{OUTAk}, V_{OUTBk})$, and this equation can still be solved to obtain $T_k$.

Scenario 2

In the second scenario, three different currents serve as inputs to the temperature sensor. These are designated as $I_{OUTA}$, $I_{OUTB}$, and $I_{OUTAB}$, where $I_{OUTAB}$ is the sum of the currents $I_{OUTA}$ and $I_{OUTB}$. These currents are selected with the switches shown in the temperature sensor. Though the currents $I_{OUTA}$ and $I_{OUTB}$ are unknown and though their ratio is now assumed unknown, the current $I_{OUTAB}$ is correlated with $I_{OUTA}$ and $I_{OUTB}$. For each of the currents at each temperature sensor location, three voltages are generated and designated as $V_{OUTAk}$, $V_{OUTBk}$, and $V_{OUTABk}$. In FIG. 9, much like in the Scenario 1 approach, this circuit has the property that the temperature of the $k^{th}$ temperature sensor can be accurately determined from the three voltages $V_{OUTAk}$, $V_{OUTBk}$, and $V_{OUTABk}$ independent of the currents, even if the currents are highly temperature dependent. This property is particularly useful since voltages can be practically measured during production test and since voltages can be practically and accurately measured during normal operation of a circuit throughout the useful life of the integrated circuit. This relationship can be expressed mathematically as there exists a function f such that:

$$\hat{T}_k = f(V_{OUTAk}, V_{OUTBk}, V_{OUTABk})$$

$$\frac{\partial \hat{T}_k}{\partial I_{OUTA}} \text{ and } \frac{\partial \hat{T}_k}{\partial I_{OUTB}} \text{ are small}$$

where $\hat{T}_k$ is a good estimator of the temperature $T_k$.

And thus if the current generator is a part of the TMC, the temperature of the TMC will play almost no role in determining the temperature of the sensor, so one obtains the temperature estimator given by the relationship:

$$\hat{T}_k = f(V_{OUTAk}, V_{OUTBk}, V_{OUTABk})$$

$$\frac{\partial \hat{T}_k}{\partial T_{TMC}} \text{ is small}$$

Modeling of Temperature Sensor

The square-law model will be used to show that ideally a function $V_{THk} = g(V_{OUTAk}, V_{OUTBk}, V_{OUTABk})$ can be obtained that is independent of $I_{OUTA}$ and $I_{OUTB}$. Then the expression for $V_{THk}$ will be solved for temperature to obtain $T_k$. It follows from the square-law model that:

$$I_{OUTA} = \frac{\mu_k C_{OXk} W_k}{2L_k}(V_{OUTAk} - V_{THk})^2$$

$$M_{AB}I_{OUTA} = \frac{\mu_k C_{OXk} W_k}{2L_k}(V_{OUTBk} - V_{THk})^2$$

$$(1 + M_{AB})I_{OUTA} = \frac{\mu_k C_{OXk} W_k}{2L_k}(V_{OUTABk} - V_{THk})^2$$

This is a set of three independent equations in the three unknowns, $M_{AB}$, $I_{OUTA}$, and $V_{THk}$. Eliminating $I_{OUTA}$ and $M_{AB}$ from these three equations, one obtains the implicit expression for $V_{THk}$.

$$\sqrt{1 + \left(\frac{V_{OUTBk} - V_{THk}}{V_{OUTAk} - V_{THk}}\right)^2}\,(V_{OUTAk} - V_{THk}) = (V_{OUTABk} - V_{THk}) \qquad \text{(Eqn 12)}$$

It can be shown that this can be expressed as a second-order polynomial in $V_{THk}$ which can be easily solved to obtain $V_{THk}$. When used in a temperature sensor, on-chip resources will likely be available for solving this quadratic equation. But for the purpose of this disclosure, details of the solution are not germane. It suffices to observe from Equation (12) that there exists a function g such that $V_{THk} = g(V_{OUTAk}, V_{OUTBk}, V_{OUTABk})$.

Now assume that the threshold voltage is linear in T and can be expressed as:

$$V_{THk}(T_k) = V_{THk0} + \gamma T_k \qquad\qquad \text{(Eqn 13)}$$

It thus follows that:

$$T_k = \frac{g(V_{OUTAk}, V_{OUTBk}, V_{OUTABk}) - V_{THk0}}{Y}$$

If a higher-order model for the temperature dependence of the threshold voltage in Equation (13) is used, the expression for $T_k$ is somewhat more complicated, but still $T_k$ can be obtained by solving the equation $V_{THk}=g(V_{OUTAk}, V_{OUTBk}, V_{OUTABk})$ for $T_k$.

TMC Implementation

Many different approaches are available for realizing the TMC for Method 2 temperature sensors. One way is to modify the TMC 102 approaches described in FIG. 7 by creating two outputs in the current mirrors.

Extensions

There are several natural extensions of the Method 1 and Method 2 sensors. Some of these will be discussed herein. Method 1 and Method 2 approaches can also be combined to obtain some additional attractive characteristics.

One way to extend the Method 1 approach is to use different combinations of the temperature-sensing transistors for the temperature-sensing elements as depicted in FIGS. 10A, 10B, 10C, and 10D by temperature sensors 502-1, 502-2, 502-3, and 502-4 respectively. The use of p-channel devices may increase the size of the sensing transistors in some processes but the overall size may still be small enough to build very compact temperature sensors. Another variant is shown in FIG. 11 at temperature sensor 502-5 where the diode 1102 can be a two-terminal pn junction or a substrate-connected bipolar junction transistor. Though the diode 1102 in FIG. 11 has its anode connected to ground, in a process that supports arbitrary diode connections, the diode 1102 could be above the MOS transistor or two series-connected diodes could be used for the temperature sensor. The expressions for estimating temperature for the circuit of FIG. 11 may be more tedious, but temperature is still embedded in just the two voltage measurements.

Another natural variant is to reference the temperature sensor to $V_{DD}$ rather than to ground. This is depicted for n-channel temperature-sensing transistors in FIG. 12 in temperature sensors 502-6 and 502-7, though any of the structures in FIG. 10 could be referenced to $V_{DD}$ rather than to ground.

Some variants of the Method 2-type temperature sensors, all referenced to ground, are shown in FIGS. 13A-F by temperature sensors 802-1, 802-2, 802-3, 802-4, 802-5, and 802-6 and in FIGS. 14A and 14B by temperature sensors 802-7, and 802-8. By using two sensing transistors or by using more than two correlated excitations, additional information about the temperature at the temperature sensor location can be obtained. This may be useful during calibration and gives the option of trading off additional temperature measurements for additional voltage measurements, the latter of which may be much more practical for calibration.

A combination of Method 1 and Method 2 temperature sensors can be shown in FIGS. 15A-F at temperatures sensors 802-9, 802-10, 802-11, 802-12, 802-13, and 802-14. Although it may appear that redundant information is being obtained with these sensors, the additional information may be useful for improving sensor accuracy when higher-order model effects are included. They may also provide useful information for improving calibration algorithms. These sensors are, however, still very compact.

The Method 1 temperature sensors can be reconfigured by switching as shown in FIG. 16 by temperature sensors 1602, 1604, and 1606. This will provide four correlated output voltages that can also be used to extract the threshold voltage and correspondingly the temperature. By different phasing of the clock signals, this can also transition from a Method 1 to a Method 2 sensor type or a sensor that combines both Method 1 and Method 2 properties. A modest amount of overhead accrues in the switching, and this may affect the compactness of the temperature sensor, but in some applications this compactness may not be of major concern.

Constant Power Micro-Heater Calibrator

The concept of using a constant power on-chip micro-heater calibrator is shown in FIG. 17. What is envisioned is a very small calibration heater 1702 that is situated in close proximity to the temperature sensor core 502 or 802 In one embodiment, the micro-heater can be placed on top of the temperature sensor core 502 or 802 but in other embodiments the heater could be placed under, beside, around, or distributed throughout the temperature sensor core. The micro-heater can locally and accurately increase the temperature based upon the amount of power applied to the heater. Creating a temperature increase of 20° C. or more in temperature for the temperature sensor core above the ambient test temperature is readily achievable, and this increase introduces an additional test temperature. If multiple different power levels are applied to the heater capacitor, multiple test temperatures can be generated. Since the use of the micro-heater is envisioned to be used only during calibration, it should have little impact on the power dissipation during normal operation, and if the heater is placed on top of the temperature sensor core, it should have little impact on the area covered be the temperature sensor. Of course, in-field self-calibration is possible with this approach to accommodate for aging and stress that may occur throughout the useful life of the temperature sensor. The vias between metal layers are resistive and can be used to generate heat, thereby enabling the heater to be placed directly on top of the temperature sensor core in one embodiment. Alternatively, the heater could be comprised partially or totally of lower-level local heaters placed closer to the single crystalline substrate or be embedded in the upper levels of the silicon substrate, and the concept depicted in FIG. 17 will still be applicable.

The challenge of using a heater to generate an increase in temperature for temperature calibration has been in accurately controlling the increase in temperature and in the large time-on-tester for the heater to generate thermal equilibrium. The present disclosure addresses both of these issues.

Although applying a fixed voltage to the heater, $V_{HEAT}$ in FIG. 17, will generate heat, variations of electrical process parameters in the heater and even die-to-die variations in electrical process parameters will result in a significant difference in the actual power applied to the heater, and thus the increase in temperature introduced by an on-chip heater would not be known. This is due to the unavoidably high sensitivity of electrical parameters to local and global process variations. But the heat transport properties of silicon are very constant, particularly if the physical dimensions of the die are fixed and the ambient test temperature is known. The relative thickness of a die and the relative dimensions of a die change very little from one die to another on a wafer and very little from one process run to another in a stable production process. Thus, instead of applying a fixed voltage to the heater, a fixed power level, $P_{HEAT}=V_{HEAT}\times I_{HEAT}$ in FIG. 17, will be applied to the heater. This fixed power level will cause an accurately predictable and repeatable rise in temperature, particularly if the ambient test temperature, $T_{TEST}$, is known. The issue of the time it takes to reach thermal equilibrium is also of some concern. If an on-chip heater were to generate enough heat to change the temperature of an entire packaged die, the time required to reach thermal equilibrium may be quite long—in the minutes range or longer. But the dimensions of the temperature sensor core will be very small, maybe as small as 100 μm² or smaller. And the lateral dimensions of the temperature sensor core will typically be much less than the thickness of the die. It can be shown that the time it takes to increase the temperature of a small volume of silicon when constant power is applied is in the tens of microseconds range (i.e., time constants in the tens of microseconds range), and local equilibrium will be reached in several time constants, likely in the milliseconds range or faster. Thus, the micro-heater capacitors can accurately change the temperature of the core temperature sensor very quickly. Though thermal equilibrium in this environment will occur very quickly, thermal equilibrium may not be critical in this calibration environment. Some of the small temperature sensor cores, particularly those based upon properties of MOS transistors or film resistors, can respond very quickly, maybe in the microsecond range or faster. And since time can be precisely measured on a tester or even with an in-field self-calibration, the calibration can alternatively be based upon a sequence of transient measurements of the temperature sensor output. Even the widely used substrate pnp transistors that are used to sense temperature are sufficiently small and sufficiently close to the silicon surface so that the micro-heater calibration approach can be used with these devices.

Though the constant-power heater calibrator is targeting temperature sensor applications, it is applicable to other precision analog circuits as well where the size of the temperature-critical part of the circuit is very small. Other applications include but are not limited to integrated voltage, current, and time (alternate frequency) references.

A large number of different temperature-sensing elements have been described. They all offer potential for accurately measuring the temperature at the temperature sensor location. Some are more practical for calibration than others, and the accuracy required for a specific application may ultimately be the key factor in determining which structure is most useful. One advantage of the Method 2 solutions is reduced headroom requirements, which may be useful in low-voltage processes. One advantage of the Method 1 solutions is what may be simpler analytic calculations. The Method 2 solutions may also require a smaller bus for interconnecting with the TMC 102 since the output voltages can be directly measured at the TMC location. These sensors have varying levels of compactness. In a bulk n-well complementary metal oxide semiconductor (CMOS) process, the absence of a well can make these sensors based on n-channel devices very small. But adding a well and using p-channel devices may reduce noise coupling. The noise levels associated with the temperature sensors themselves may vary significantly as well, with p-channel transistors typically having a lower 1/f noise corner frequency. Referencing to $V_{DD}$ rather than to ground may also be attractive since the noise inherent in the substrate of a bulk n-well CMOS process may be quite large if the circuit has a large amount of digital activity. Regardless, all have the property that the temperature dependence of the current that is applied to the sensors only weakly affects the performance of the temperature sensor and as such, the temperature of the TMC will play a minor role in determining the performance of the sensors.

The practicality of the different types of temperature sensors described is partially dependent on the size of the bus that is required to interface between the TMC and the temperature sensors. There are different interfacing requirements for the temperature sensors as disclosed.

The present analysis was based exclusively on a square-law model. More exact BSIM models for the devices have been used to predict the performance of the temperature sensors as disclosed. Accuracy to better than 0.1° C. over a critical 20° C. used for power/thermal management of on-chip temperature sensors appears attainable, and accuracy to better than 1° C. over a 100° C. temperature range appears achievable as well.

Calibration is a critical part of many precision analog circuits including temperature sensors, voltage references, and current references. One of the biggest challenges in calibrating such structures is compensating for the dependence of temperature on the outputs. The easiest way to calibrate said circuits is to take measurements at two or more precisely known temperatures and then to do calibration based upon developing empirical models for the effects of temperature on device performance. But generating two or more accurate test temperatures dramatically increases test costs. The temperature calibration approach as disclosed can practically, accurately, and rapidly generate accurate on-chip temperatures provided that the area of the temperature-critical circuit is small.

Those skilled in the art will recognize improvements and modifications to the preferred embodiments of the present disclosure. All such improvements and modifications are considered within the scope of the concepts disclosed herein and the claims that follow.

What is claimed is:

1. A temperature sensor circuit comprising:
a current generator that generates a current;
a temperature sensing element that receives the current and generates at least two voltages based on the current; and
a temperature controller that, based on a function of the at least two voltages, determines a temperature at the temperature sensing element.

2. The temperature sensor circuit of claim 1, further comprising:
a multiplexer that provides the current to a plurality of temperature sensing elements,
wherein the temperature controller determines temperatures at each of the temperature sensing elements based on the at least two voltages measured at each of the plurality of temperature sensing elements.

3. The temperature sensor circuit of claim 1, wherein each voltage of the at least two voltages is associated with a respective transistor.

4. The temperature sensor circuit of claim 1, wherein the current generated by the current generator can be at least one of:
non-linear with respect to a temperature of the current generator;
constant with respect to the temperature of the current generator; or
proportional to absolute temperature of the current generator.

5. The temperature sensor circuit of claim 1, wherein the temperature controller determines the temperature at the temperature sensing element based solely on the two voltages.

6. The temperature sensor circuit of claim 1, wherein the temperature sensing element is a series connection of two or more temperature sensitive devices and the at least two voltages are the voltages across the temperature sensitive devices in response to the current.

7. The temperature sensor circuit of claim 6, wherein the series connection comprises two diode connected transistors.

8. The temperature sensor circuit of claim 6, further comprising:
   a multiplexer that provides the current to a plurality of temperature sensors,
   wherein the temperature controller determines temperatures at each of the temperature sensing elements based on a pair of voltages measured at each of the plurality of temperature sensors.

9. The temperature sensor circuit of claim 6, further comprising:
   a heater that supplies constant power to the temperature sensing element for a period of time, and
   wherein the temperature controller determines a sequence of temperatures at the temperature sensing element at intervals during the period of time and performs self-calibration based on a function of the sequence of temperatures.

10. A temperature sensor circuit comprising:
   a current generator that generates two or more currents;
   two or more temperature sensing elements that receive one current at a time and generate at least two voltages based on each of the currents; and
   a temperature controller that, based on a function of the at least two voltages, determines a temperature at the temperature sensing elements.

11. The temperature sensor circuit of claim 10, wherein the current generator generates two currents in response to the two currents having a known ratio.

12. The temperature sensor circuit of claim 10, wherein the current generator generates three currents in response to two currents of the three currents having an unknown ratio, wherein a third current is a sum of the two currents.

13. The temperature sensor circuit of claim 10, further comprising:
   a multiplexer that provides the two or more currents to a plurality of temperature sensors, wherein the temperature controller determines temperatures at each of the temperature sensing elements based on the at least two voltages measured at each of the plurality of temperature sensors.

14. The temperature sensor circuit of claim 10, further comprising:
   a heater that receives a constant power from an external source wherein the heater is used to calibrate the temperature sensitive parameters of the temperature sensing elements.

15. A temperature sensor circuit, comprising:
   a current generator that generates two or more currents;
   a temperature sensing element that receives the two or more currents one at a time and generates two or more voltages based on the two or more currents, wherein the temperature sensing element is a single transistor; and
   a temperature controller that, based on a function of the two or more voltages, determines a temperature at the temperature sensing element.

16. The temperature sensor circuit of claim 15, wherein the current generator generates two currents in response to the two currents having a known ratio.

17. The temperature sensor circuit of claim 15, wherein the current generator generates a third current in response to two currents of the three currents having an unknown ratio, wherein the third current is a sum of the two currents, and wherein each device in the temperature sensing element generates three voltages.

18. The temperature sensor circuit of claim 17, wherein the temperature controller determines the temperature at the temperature sensing element based on a function of the three voltages.

19. The temperature sensor circuit of claim 15, further comprising:
   a heater that receives a constant power from an external source wherein the heater is used to calibrate temperature sensitive parameters of the temperature sensing elements.

* * * * *